United States Patent
Jiang

(10) Patent No.: US 10,706,353 B2
(45) Date of Patent: Jul. 7, 2020

(54) INTEGRATED CIRCUIT

(71) Applicant: SHENZHEN INTELLIFUSION TECHNOLOGIES CO., LTD., Shenzhen (CN)

(72) Inventor: Wen Jiang, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/624,920

(22) PCT Filed: Dec. 26, 2017

(86) PCT No.: PCT/CN2017/118579
§ 371 (c)(1),
(2) Date: Dec. 20, 2019

(87) PCT Pub. No.: WO2019/119480
PCT Pub. Date: Jun. 27, 2019

(65) Prior Publication Data
US 2020/0134433 A1  Apr. 30, 2020

(30) Foreign Application Priority Data
Dec. 20, 2017  (CN) .......................... 2017 1 1386741

(51) Int. Cl.
*G06N 3/063* (2006.01)
*G06F 7/544* (2006.01)
(Continued)

(52) U.S. Cl.
CPC ........... *G06N 3/063* (2013.01); *G06F 3/0604* (2013.01); *G06F 3/0659* (2013.01);
(Continued)

(58) Field of Classification Search
CPC ..... G06N 3/063; G06F 3/0604; G06F 3/0659; G06F 7/5443; G06F 13/4022; G06F 3/0673; G06K 9/00973
See application file for complete search history.

(56) References Cited

U.S. PATENT DOCUMENTS

2009/0002586 A1*  1/2009  Kimura ............. G02F 1/133621
                                                    349/39
2014/0285406 A1*  9/2014  Kimura ............... G09G 3/3291
                                                    345/76
(Continued)

FOREIGN PATENT DOCUMENTS

CN           1917576 A       2/2007
CN         106203617 A      12/2016
(Continued)

OTHER PUBLICATIONS

International Search Report issued in corresponding International application No. PCT/CN2017/118579, dated Feb. 28, 2018.
(Continued)

*Primary Examiner* — Kamran Afshar
*Assistant Examiner* — Imad Kassim

(57) ABSTRACT

An integrated circuit includes a data storage circuit, a weight storage circuit, and an operation circuit. The data storage circuit stores, according to a preset control instruction, gray-scale value data of an image in a first preset time period; the weight storage circuit stores a data weight corresponding to the gray-scale value data in the first preset time period; the operation circuit carries out an operation on the gray-scale value data and the data weight in the first preset time period and outputs first data; the data storage circuit further stores the first data according to the preset control instruction in a second preset time period; the weight storage circuit further stores the data weight corresponding to the first data in the second preset time period; the operation circuit carries out an operation on the first data and the data weight in the second time period and outputs second data.

9 Claims, 5 Drawing Sheets

(51) Int. Cl.
*G06F 3/06* (2006.01)
*G06K 9/00* (2006.01)
*G06F 13/40* (2006.01)

(52) U.S. Cl.
CPC .......... *G06F 3/0673* (2013.01); *G06F 7/5443* (2013.01); *G06F 13/4022* (2013.01); *G06K 9/00973* (2013.01)

(56) References Cited

U.S. PATENT DOCUMENTS

| | | | | |
|---|---|---|---|---|
| 2015/0339589 A1* | 11/2015 | Fisher | ................ | G06K 9/00805 706/12 |
| 2016/0351115 A1* | 12/2016 | Bang | .................... | G09G 3/3208 |
| 2017/0132514 A1* | 5/2017 | Krizhevsky | .............. | G06N 3/04 |
| 2018/0189932 A1* | 7/2018 | Kopysov | .................. | G06T 5/50 |
| 2019/0114020 A1* | 4/2019 | Ding | .................... | H01L 27/323 |

FOREIGN PATENT DOCUMENTS

| | | |
|---|---|---|
| CN | 106355244 A | 1/2017 |
| CN | 107341544 A | 11/2017 |

OTHER PUBLICATIONS

Written Opinion of the International Searching Authority for No. PCT/CN2017/118579, dated Feb. 28, 2018.
Initial Publication for PCT/CN2017/118579.

* cited by examiner

INTEGRATED CIRCUIT

CROSS-REFERENCE TO RELATED APPLICATIONS

This application claims the benefit of priority from Chinese Patent Application NO. 201711386741.8 entitled "INTEGRATED CIRCUIT" and filed on Dec. 20, 2017, the content of which is hereby incorporated in its entire by reference.

FIELD

The present invention relates to the field of image processing, and more particularly, to an integrated circuit.

BACKGROUND

A Convolutional Neural Network (CNN) is an efficient image recognition method that has been developed in recent years and attracted wide attention. It has excellent performance in large image processing. At present, the convolutional neural network has become one of the research hotspots in many scientific fields. Since the convolutional neural network can avoid complex pre-processing for images and can directly input original images, so it has been more widely used in the field of pattern classification.

Generally speaking, the convolutional neural network includes a convolution layer, a pooling layer and a full connection layer. In practical applications, calculations of the convolution layer accounts for more than 90% of total calculated amount. Although the calculation of the full connection layer accounts for a small proportion, it has a large number of weights. At present, two sets of independent hardware are generally required to calculate the convolution layer and the full connection layer respectively, which can be done in parallel in theory. However, because of small proportion of calculation amount involved in the full connection layer, so that an engine are idle in most cases, which leads to wasting of resources.

Therefore, the existing convolutional neural networks have problems of high hardware costs and waste of resources.

SUMMARY

Embodiments of the present invention provide an integrated circuit, which is aimed at solving the problems of high hardware costs and waste of resources in the existing convolutional neural networks.

The first aspect of the invention provides an integrated circuit, the integrated circuit includes:

a data storage circuit, a weight storage circuit and an operation circuit;

the data storage circuit and the weight storage circuit electrically connected to the operation circuit;

the data storage circuit configured to store gray-scale value data of an image in a first preset time period, according to a preset control instruction, the weight storage circuit configured to store a data weight corresponding to the gray-scale value data of the image in the first preset time period, the operation circuit configured to carry out an operation on the gray-scale value data in the data storage circuit and the data weight in the weight storage circuit in the first preset time period, and output first data;

the data storage circuit further configured to store the first data in a second preset time period, according to the preset control instruction, the weight storage circuit further configured to store the data weight corresponding to the first data in the second preset time period, and the operation circuit further configured to carry out an operation on the first data in the data storage circuit and the data weight corresponding to the first data and stored in the weight storage circuit, and output second data.

In an embodiment, the data storage circuit includes:

a data memory, N*M−1 selectors, N*M data registers, and N−1 First in First Output (FIFO) memories;

a first switch selection port of each selector and an input port of a first data register electrically connected to a data output port of the data memory, second switch selection ports of first to (M−1)-th selectors correspondingly and electrically connected to positive phase output ports of first to (M−1)-th data registers respectively, and a second switch selection port of a M-th selector electrically connected to an output port of a first FIFO memory, a positive phase output port of a M-th data register electrically connected to an input port of the first FIFO memory;

and so on, a second switch selection port of each of ((N−2)*M+1)-th to ((N−1)*M−1)-th selectors respectively and electrically connected to a positive phase output port of each of ((N−2)*M+1)-th to ((N−1)*M−1)-th data registers correspondingly, a second switch selection port of a (N−1)*M-th selector correspondingly and electrically connected to an output port of a (N−1)-th FIFO memory, and a positive phase output port of a (N−1)*M-th data register correspondingly and electrically connected to an input port of the (N−1)-th FIFO memory;

second switch selection ports of ((N−1)*M+1)-th to (N*M−1)-th selectors respectively and electrically connected to positive phase output ports of ((N−1)*M+1)-th to (N*M−1)-th data registers correspondingly, output ports of first to (N*M−1)-th selectors correspondingly and electrically connected to input ports of second to N*M-th data registers respectively, and positive phase output ports of first to N*M-th data registers electrically connected to the operation circuit;

the N*M data registers configured to receive the gray-scale value data of the image transmitted by the data memory in the first preset time period, and receive the data in the first data transmitted by the data memory in the second preset time period; the N*M−1 selectors configured to make the second switch selection port of each selector electrically connected to the positive phase output port of each data register or the output port of each FIFO memory, and make the first switch selection port of each selector disconnected from the data output port of the data memory in the first preset time period, and make the first switch selection port of each selector electrically connected to the data output port of the data memory, and make the second switch selection port of each selector disconnected from the positive phase output port of each data register or the output port of each FIFO memory in the second preset time period, according to the preset control instruction;

wherein, M and N being positive integers greater than 1.

In an embodiment, the weight storage circuit includes:

a weight memory and N*M weight registers;

an input port of each weight register electrically connected to an output port of the weight memory, and positive phase output ports of first to N*M-th weight registers electrically connected to the operation circuit;

the N*M weight registers configured to receive the data weight corresponding to the gray-scale value data of the image transmitted by the weight memory in the first preset time period, and receive the data weight corresponding to the first data transmitted by the weight memory in the second preset time period.

In an embodiment, the operation circuit includes:

a multiplication unit and an addition unit;

the positive phase output ports of first to N*M-th data registers electrically connected to the operation circuit, comprising: the positive phase output ports of the first to N*M-th data registers electrically connected to the multiplication unit;

the positive phase output ports of first to N*M-th weight registers electrically connected to the operation circuit, comprising: the positive phase output ports of the first to N*M-th weight registers electrically connected to the multiplication unit;

an output of the multiplication unit electrically connected to the addition unit;

the multiplication unit configured to multiply the gray-scale value data of the images transmitted by the first to N*M-th data registers and the data weights corresponding to the gray-scale value data of the images transmitted by the first to N*M-th weight registers and obtain multiple products, and transmit the products to the addition unit; the addition unit is configured to add the products transmitted from the multiplication unit to obtain the data in the first data, in the first preset time period;

the multiplication unit further configured to multiply the data in the first data transmitted by the first to N*M-th data registers and the data weights corresponding to the first data transmitted by the first to N*M-th weight registers and obtain multiple products, and transmit the products to the addition unit; the addition unit further configured to add the products transmitted from the multiplication unit to obtain the data in the second data, in the second preset time period.

In an embodiment, the multiplication unit includes:

N*M multipliers;

the positive phase output ports of the first to N*M-th data registers electrically connected to the multiplication unit, comprising: the positive phase output port of each of the first to N*M-th data registers respectively and electrically connected to a first input port of each of first to N*M-th multipliers correspondingly;

the positive phase output ports of the first to N*M-th weight registers electrically connected to the multiplication unit, comprising: the positive phase output port of each of the first to N*M-th weight registers respectively and electrically connected to a second input port of each of the first to N*M-th multipliers correspondingly;

the multiplication unit configured to multiply the gray-scale value data of the images transmitted by the first to N*M-th data registers and the data weights corresponding to the gray-scale value data of the images transmitted by the first to N*M-th weight registers, in the first preset time period, comprising:

the first to N*M-th multipliers configured to multiply the gray-scale value data of the images transmitted by the first to N*M-th data registers and the data weight corresponding to the gray-scale value data of the images transmitted by the first to N*M-th weight registers in the first preset time period;

the multiplication unit further configured to multiply the data in the first data transmitted by the first to N*M-th data registers and the data weights corresponding to the first data transmitted by the first to N*M-th weight registers, in the second preset time period, including:

the first to N*M-th multipliers configured to multiply the data in the first data transmitted by the first to N*M-th data registers and the data weights corresponding to the first data transmitted by the first to N*M-th weight registers in the second preset time period.

In an embodiment, the addition circuit includes:

N+1 adders;

the output of the multiplication unit electrically connected to the addition unit, comprising;

output ports of the first to M-th multipliers respectively and electrically connected to first to M-th input ports of a first adder, output ports of (1*M+1)-th to 2*M-th multipliers respectively and electrically connected to first to M-th input ports of a second adder, and so on, output ports of ((N−2)*M+1)-th to ((N−1)*M)-th multipliers respectively and electrically connected to first to M-th input ports of a (N−1)-th adder, output ports of ((N−1)*M+1)-th to N*M-th multipliers respectively and electrically connected to first to M-th input ports of a N-th adder;

output ports of first to N-th adders respectively and electrically connected to first to N-th input ports of a (N+1)-th adder, an output port of the (N+1)-th adder outputting the first data in the first preset time period and outputting the second data in the second preset time period;

the addition unit configured to add the products transmitted from the multiplication unit to obtain the data in the first data, comprising:

the first to N-th adders configured to add the products transmitted by the first to N*M-th multipliers in the first preset time period, and the (N+1)-th adder configured to add outputs from the first to N-th adders to obtain the data in the first data;

the addition unit further configured to add the products transmitted from the multiplication unit to obtain the data in the second data, including:

the first to N-th adders configured to add the products transmitted by the first to N*M-th multipliers in the second preset time period, and the (N+1)-th adder configured to add the outputs from the first to N-th adders to obtain the data in the second data.

In an embodiment, the N and the M are equal.

In an embodiment, the N and the M are both equal to 3.

In an embodiment, the data memory is a memory whose model is IS6IC256AL or IS61LV6416 or CY62128B, the N*M data registers are registers whose model is 74LS175 or 74LS194, the model of the N*M−1 selectors is SN54HC257 or SN54HC258 or SN74HC257 or SN74HC257 or SN74HC258, the N−1 FIFO memories are FIFO memories whose model is AL422 or AL422B or AL400B-12 or GS7201AL, the weight memory is a memory whose model is IS61C256AL or IS61LV6416 or CY62128B, and the N*M weight registers are registers whose model is 74LS175 or 74LS194.

In an embodiment, the model of the N*M multipliers is GC1496 or GC1496B, and the model of the N+1 adders is 74LS283 or 74LS580 or 74ALS580.

In the present invention, the integrated circuit includes a data storage circuit, a weight storage circuit, and an operation circuit, and the data storage circuit and the weight storage circuit are electrically connected to the operation circuit. The data storage circuit is used to store gray-scale value data of an image in a first time period, according to a preset control instruction; the weight storage circuit is used to store data weight corresponding to the gray-scale value data of the image in the first preset time period; the operation circuit is used to carry out an operation on the gray-scale value data in the data storage circuit and the data weight in the weight storage circuit in the first preset time period, to obtain first data, and output the first data. The data storage circuit is further used to store the first data in a second preset time period, according to the preset control instruction; the weight storage circuit is further used to store data weight corresponding to the first data in the second preset time period; the operation circuit is further used to carry out an operation on the first data in the data storage circuit and the data weight corresponding to the first data and stored in the weight storage circuit in the second preset time period, to obtain second data, and output the second data. The integrated circuit in the present invention can support calculation of a convolutional layer and of a full connection layer simultaneously, thereby reducing hardware costs of a convolutional neural network, and effectively utilizing resources of the convolutional neural network.

BRIEF DESCRIPTION OF THE DRAWINGS

In order to more clearly understand the technical solution hereinafter in embodiments of the present invention, a brief description to the drawings used in detailed description of embodiments hereinafter is provided thereof. Obviously, the drawings described below are some embodiments of the invention, for persons of ordinary skills in this field, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. Based on the embodiments of the invention, all other embodiments obtained by persons of ordinary skills in this field without creative work shall fall within the protection scope of the present invention.

Figure 1:
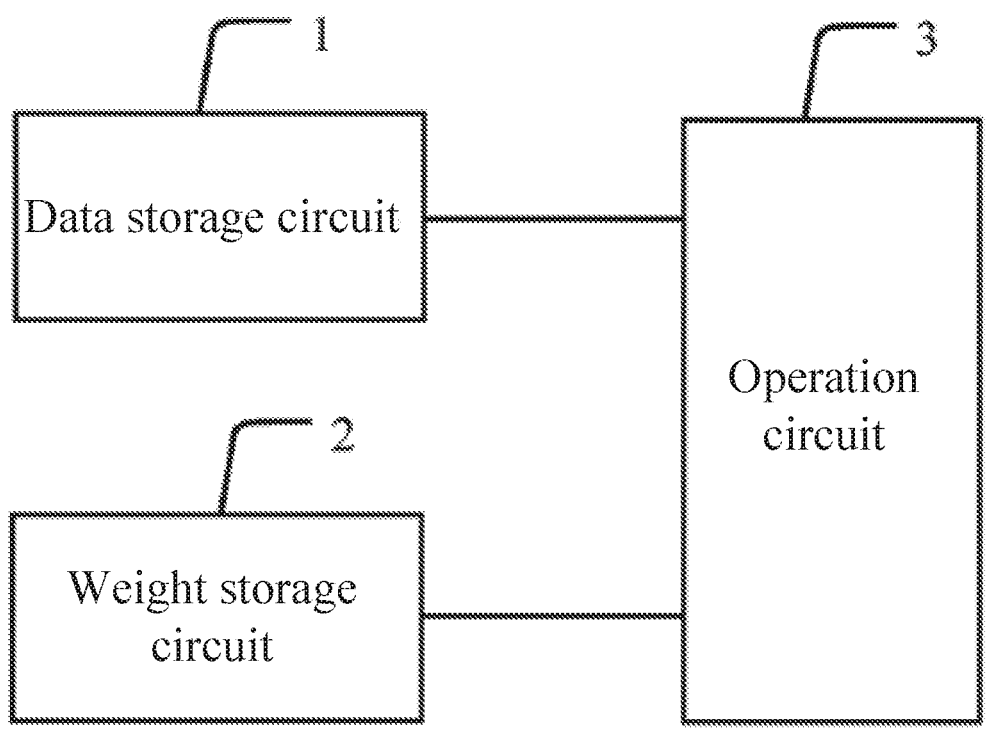
FIG. 1 is a block diagram of an integrated circuit provided in one embodiment of the present invention.

FIG. 1 illustrates a block diagram of an integrated circuit provided in one embodiment of the present invention. For the convenience of explanation, only the parts related to embodiments of the invention are shown, which are described as follows in detail.

As shown in FIG. 1, the integrated circuit at least includes a data storage circuit 1, a weight storage circuit 2 and an operation circuit 3. The data storage circuit 1 and the weight storage circuit 2 are electrically connected to the operation circuit 3.

The data storage circuit 1 is configured to store gray-scale value data of an image in a first preset time period, according to a preset control instruction; the weight storage circuit 2 is configured to store data weight corresponding to the gray-scale value data of the image in the first preset time period; the operation circuit 3 is configured to carry out an operation on the gray-scale value data stored in the data storage circuit 1 and the data weight stored in the weight storage circuit 2 in the first preset time period, to obtain first data, and output the first data.

The data storage circuit 1 is further configured to store the first data in a second preset time period, according to the preset control instruction; the weight storage circuit 2 is further configured to store data weight corresponding to the first data in the second preset time period; the operation circuit 3 is further configured to carry out an operation on the first data stored in the data storage circuit 1 and the data weight corresponding to the first data and stored in the weight storage circuit 2 in the second preset time period, to obtain second data, and output the second data.

In one embodiment, the gray-scale value data of the image can be gray-scale value data of binary format, that is, the gray-scale value data of image can be gray-scale value data expressed in binary format. In other embodiments, the gray-scale value data of the image can also be gray-scale value data of other formats.

In one embodiment, the preset control instruction is a control instruction set in advance. Each of the first preset time period and the second preset time period is time period set in advance. In order to save engine resources and improve efficiency, the first preset time period and the second preset time period can be set alternately in advance, and calculations of a convolutional layer and a full connection layer are performed in the first preset time period and the second preset time period respectively, that is, the convolutional layer is calculated in the first preset time period, and the full connection layer is calculated in the second preset time period. The first data and the second data are eigenvalue data of the image and are expressed in the form of vector or matrix.

In one embodiment, the integrated circuit includes a data storage circuit 1, a weight storage circuit 2 and an operation circuit 3. The data storage circuit 1 and the weight storage circuit 2 are electrically connected to the operation circuit 3. The data storage circuit 1 is configured to store the gray-scale value data of the image in the first preset time period, according to the preset control instruction; the weight storage circuit 2 is configured to store the data weight corresponding to the gray-scale value data of the image in the first preset time period; the operation circuit 3 is configured to carry out an operation on the gray-scale value data stored in the data storage circuit 1 and the data weight stored in the weight storage circuit 2 in the first preset time period, to obtain the first data, and output the first data. The data storage circuit 1 is further configured to store the first data in the second preset time period, according to the preset control instruction; the weight storage circuit 2 is further configured to store the data weight corresponding to the first data in the second preset time period; the operation circuit 3 is further configured to carry out an operation on the first data stored in the data storage circuit 1 and the data weight corresponding to the first data and stored in the weight storage circuit 2 in the second preset time period, to obtain the second data, and output the second data. The integrated circuit in this embodiment of the invention can carry out a convolution operation in the first preset time period, and perform a calculation of the full connection layer in the second preset time period. Therefore, the integrated circuit can support the calculations of the convolutional layer and of the full connection layer, thereby reducing hardware costs of a convolutional neural network, and effectively utilizing the resources of the convolutional neural network.

Figure 2:
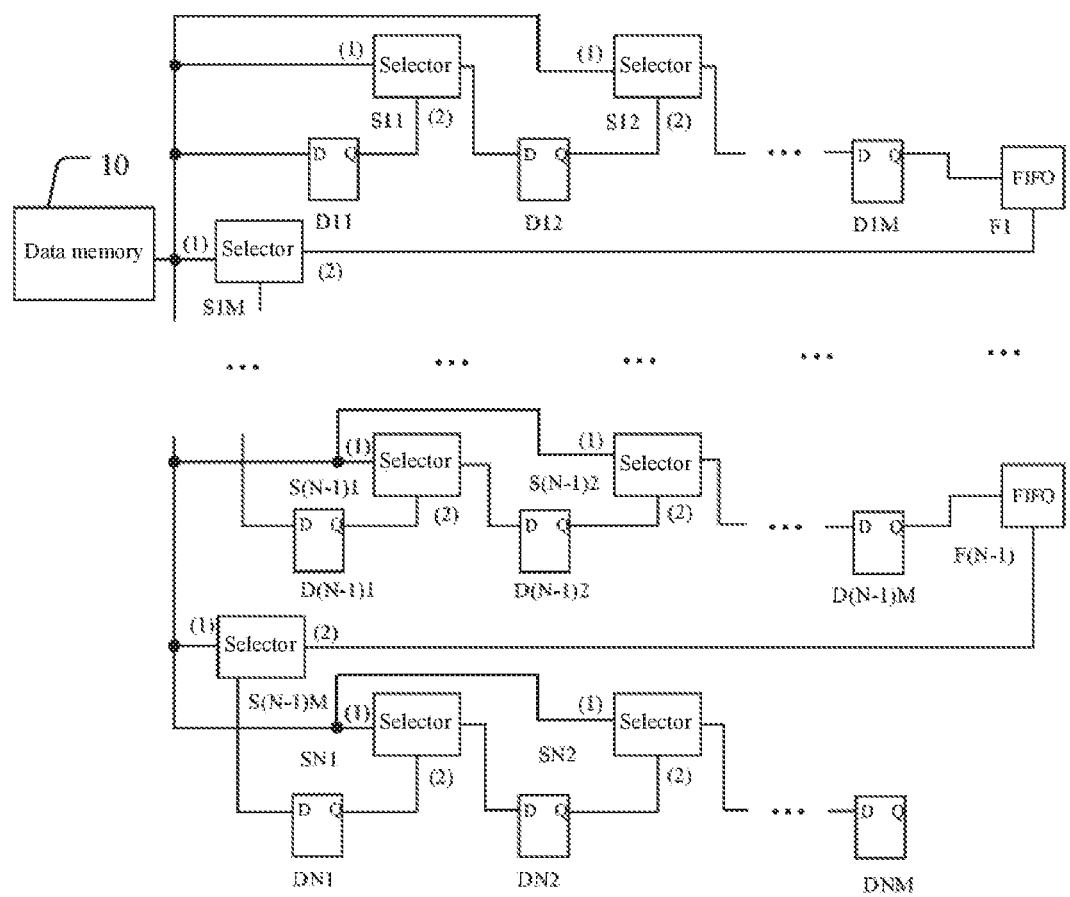
FIG. 2 is a circuit diagram of a data storage circuit 1 of the integrated circuit as shown in FIG. 1 of the present invention.

FIG. 2 illustrates a circuit diagram of a data storage circuit 1 of the integrated circuit as shown in FIG. 1 of the present invention. For the convenience of explanation, only the parts related to embodiments of the invention are shown, which are described as follows in detail.

In one embodiment, as shown in FIG. 2, the data storage circuit 1 includes: a data memory 10, N*M−1 selectors, N*M data registers, and N−1 First in First Output (FIFO) memories.

A first switch selection port (1) of each selector and an input port D of the first data register D11 are electrically connected to a data output port of the data memory 10, second switch selection ports (2) of first to (M−1)-th selectors are correspondingly electrically connected to positive phase output ports Q of first to (M−1)-th data registers respectively. That is, the second switch selection port (2) of each of the first to (M−1)-th selectors is electrically connected to the positive phase output port Q of each of the first to (M−1) data registers, for example, the second switch selection port (2) of the first selector is electrically connected to the positive phase output port Q of the first data register, the second switch selection port (2) of the second selector is electrically connected to the positive phase output port Q of the second data register, the second switch selection port (2) of the third selector is electrically connected to the positive phase output port Q of the third data register, . . . , the second switch selection port (2) of the (M−1)-th selector is electrically connected to the positive phase output port Q of the (M−1)-th data register. The second switch selection port (2) of a M-th selector SIM is electrically connected to an output port of a first FIFO memory F1, and the positive phase output port Q of a M-th data register DIM is electrically connected to an input port of the first FIFO memory F1 correspondingly.

As so on, the second switch selection port (2) of each of ((N−2)*M+1)-th to ((N−1)*M−1)-th selectors is respectively and electrically connected to the positive phase output port Q of each of ((N−2)*M+1)-th to ((N−1)*M−1)-th data registers correspondingly. The second switch selection port (2) of the (N−1)*M-th selector S(N−1)M is electrically connected to the output port of a (N−1)-th FIFO memory F(N−1) correspondingly, and the positive phase output port Q of a (N−1)*M-th data register D(N−1)M-th is electrically connected to the input port of a (N−1)-th FIFO memory F(N−1) correspondingly.

The second switch selection ports (2) of ((N−1)*M+1)-th to (N*M−1)-th selectors are respectively and electrically connected to the positive phase output ports Q of ((N−1)*M+1)-th to (N*M−1)-th data registers correspondingly. Output ports of the first to (N*M−1)-th selectors are electrically connected to input ports D of second to N*M-th data registers respectively, and the positive phase output ports Q of the first to N*M-th data registers are electrically connected to the operation circuit 3 correspondingly.

The N*M data registers are configured to receive the gray-scale value data of the image transmitted by the data memory 10 in the first preset time period, and receive the data in the first data transmitted by the data memory 10 in the second preset time period. The N*M−1 selectors are configured to make the second switch selection port (2) of each selector electrically connected to the positive phase output port of each data register or the output port of each FIFO memory, and make the first switch selection port (1) of each selector disconnected from the data output port of the data memory 10 in the first preset time period, and make the first switch selection port (1) of each selector electrically connected to the data output port of the data memory 10, and make the second switch selection port (2) of each selector disconnected from the positive phase output port of each data register or the output port of each FIFO memory in the second preset time period, according to the preset control instruction. Where, M and N are positive integers greater than 1. In one embodiment, the N and M are equal; for example, N and M are both equal to 3.

Figure 3:
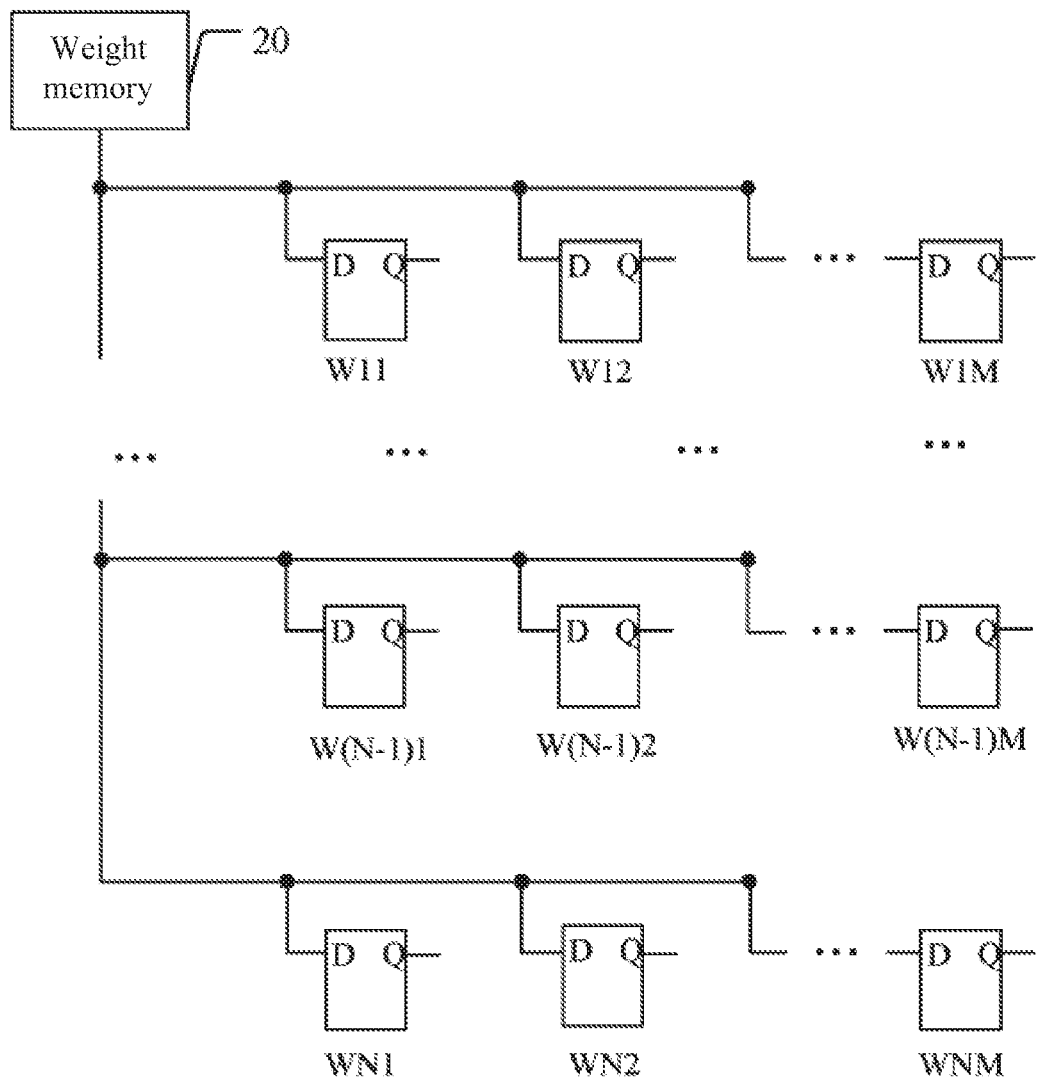
FIG. 3 is a circuit diagram of a weight storage circuit 2 of the integrated circuit as shown in FIG. 1 of the present invention.

FIG. 3 illustrates a circuit diagram of a weight storage circuit 2 of the integrated circuit as shown in FIG. 1 of the present invention. For the convenience of explanation, only the parts related to embodiments of the invention are shown, which are described as follows in detail.

In one embodiment, as shown in FIG. 3, the weight storage circuit 2 includes a weight memory 20 and N*M weight registers. Input port D of each weight memory 20 is electrically connected to an output port of the weight memory 20, and the positive phase output ports Q of first to N*M-th weight registers are electrically connected to the operation circuit 30.

The N*M weight registers are configured to receive the data weight corresponding to the gray-scale value data of the image transmitted by the weight memory 20 in the first preset time period, and receive the data weight corresponding to the first data transmitted by the weight memory 20 in the second preset time period.

Figure 4:
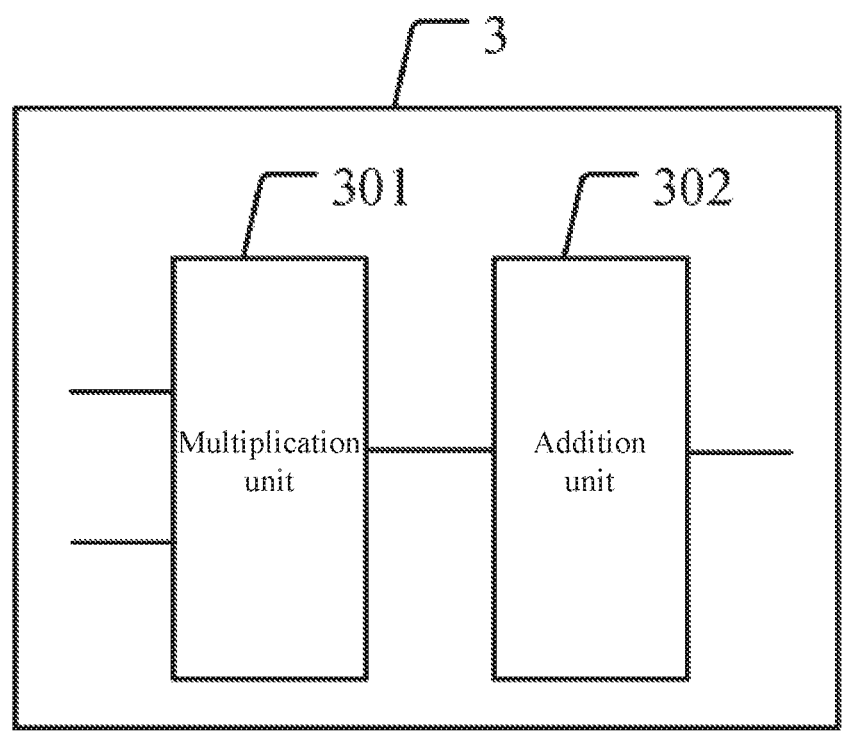
FIG. 4 is a block diagram of an operation circuit 3 of the integrated circuit as shown in FIG. 1 of the present invention.

FIG. 4 illustrates a block diagram of an operation circuit 3 of the integrated circuit as shown in FIG. 1 of the present invention. For the convenience of explanation, only the parts related to embodiments of the invention are shown, which are described as follows in detail.

In one embodiment, as shown in FIG. 4, the operation circuit 3 includes a multiplication unit 301 and an addition unit 302.

The positive phase output ports Q of the first to N*M-th data registers being electrically connected to the operation circuit 3 includes: the positive phase output ports Q of the first to N*M-th data registers being electrically connected to the multiplication unit 301.

The positive phase output ports Q of the first to N*M-th weight registers being electrically connected to the operation circuit 3 includes: the positive phase output ports Q of the first to N*M-th weight registers being electrically connected to the multiplication unit 301.

An output port of the multiplication unit 301 is electrically connected to the addition unit 302.

The multiplication unit 301 is configured to multiply the gray-scale value data of the images transmitted by the first to N*M-th data registers and the data weights corresponding to the gray-scale value data of the images transmitted by the first to N*M-th weight registers and obtain multiple products, and transmit the products to the addition unit 302, in the first preset time period. The addition unit 302 is configured to add the products transmitted from the multiplication unit 301 to obtain the data in the first data.

The multiplication unit 301 is further configured to multiply the data in the first data transmitted by the first to N*M-th data registers and the data weights corresponding to the first data transmitted by the first to N*M-th weight registers and obtain multiple products, and transmit the products to the addition unit 302, in the second preset time period. The addition unit 302 is further configured to add the products transmitted from the multiplication unit 301 to obtain the data in the second data.

Figure 5:
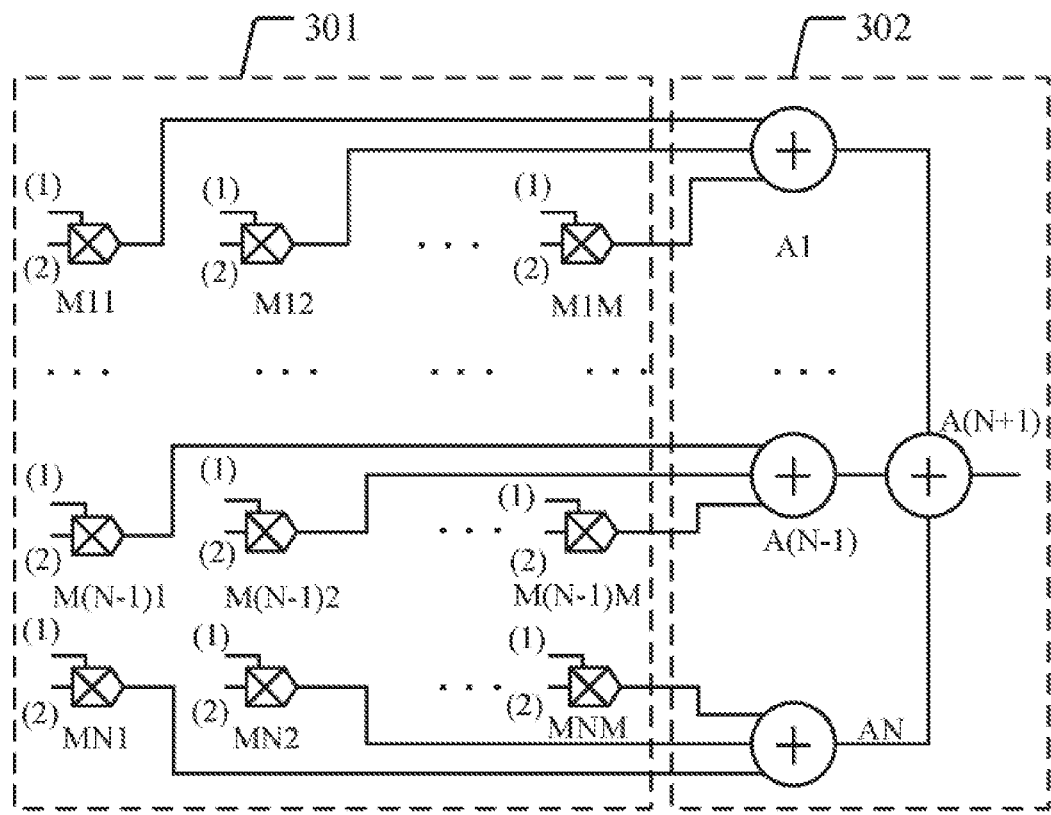
FIG. 5 is a circuit diagram of an operation circuit 3 of the integrated circuit as shown in FIG. 1 of the present invention.

FIG. 5 illustrates a circuit diagram of an operation circuit 3 of the integrated circuit as shown in FIG. 1 of the present invention. For the convenience of explanation, only the parts related to embodiments of the invention are shown, which are described as follows in detail.

In one embodiment, as shown in FIG. 5, the multiplication unit 301 includes N*M multipliers.

The positive phase output ports Q of the first to N*M-th data registers being electrically connected to the multiplication unit 301 includes: the positive phase output port Q of each of the first to N*M-th data registers being respectively and electrically connected to a first input port (1) of each of first to N*M-th multipliers correspondingly.

The positive phase output ports Q of the first to N*M-th weight registers being electrically connected to the multiplication unit 301 includes: the positive phase output port Q of each of the first to N*M-th weight registers being respectively and electrically connected to a second input port (2) of each of the first to N*M-th multipliers correspondingly.

The multiplication unit 301 configured to multiply the gray-scale value data of the images transmitted by the first to N*M-th data registers and the data weight corresponding to the gray-scale value data of the images transmitted by the first to N*M-th weight registers, includes: the first to N*M-th multipliers configured to multiply the gray-scale value data of the images transmitted by the first to N*M-th data registers and the data weight corresponding to the gray-scale value data of the images transmitted by the first to N*M-th weight registers in the first preset time period.

The multiplication unit 301 further configured to multiply, in the second preset time period, the data in the first data transmitted by the first to N*M-th data registers and the data weight corresponding to the first data transmitted by the first to N*M-th weight registers, includes: the first to N*M-th multipliers configured to multiply the data in the first data transmitted by the first to N*M-th data registers and the data weights corresponding to the first data transmitted by the first to N*M-th weight registers in the second preset time period.

In an embodiment, as shown in FIG. 5, the addition unit 302 includes N+1 adders.

The output port of the multiplication unit 301 electrically connected to the addition unit 302 includes:

the output ports of the first to M-th multipliers being respectively and electrically connected to first to M-th input ports of a first adder A1, the output ports of (1*M+1)-th to 2*M-th multipliers being respectively and electrically connected to first to M-th input ports of a second adder A2, and so on, output ports of ((N−2)*M+1)-th to ((N−1)*M)-th multipliers being respectively and electrically connected to first to M-th input ports of a (N−1)-th adder A(N−1), output ports of ((N−1)*M+1)-th to N*M-th multipliers being respectively and electrically connected to first to M-th input ports of a N-th adder AN;

output ports of first to N-th adders being respectively and electrically connected to first to N-th input ports of a (N+1)-th adder A(N+1), an output port of the (N+1)-th adder A(N+1) outputting the first data in the first preset time period and outputting the second data in the second preset time period.

The addition unit 302 configured to add the products transmitted from the multiplication unit 301 to obtain the data in the first data, includes:

the first to N-th adders being configured to add the products transmitted by the first to N*M-th multipliers in the first preset time period, and the (N+1)-th adder A(N+1) being configured to add outputs from the first to N-th adders to obtain the data in the first data.

The addition unit 302 being further configured to add the products transmitted from the multiplication unit 301 to obtain the data in the second data, includes:

the first to N-th adders being configured to add the products transmitted by the first to N*M-th multipliers in the second preset time period, and the (N+1)-th adder A(N+1) being configured to add the outputs from the first to N-th adders to obtain the data in the second data.

In an embodiment, the data memory 10 is a memory whose model is IS6IC256AL or IS61LV6416 or CY62128B. The N*M data registers are registers whose model is 74LS175 or 74LS194. The model of the N*M−1 selectors is SN54HC257 or SN54HC258 or SN74HC257 or SN74HC257 or SN74HC258. The N−1 FIFO memories are FIFO memories whose model is AL422 or AL422B or AL400B-12 or GS7201AL. The weight memory is a memory whose model is IS6IC256AL or IS61LV6416 or CY62128B. The N*M weight registers are registers whose model is 74LS175 or 74LS194.

In an embodiment, the model of the N*M multipliers is GC1496 or GC1496B, and the model of the N+1 adders is 74LS283 or 74LS580 or 74ALS580.

The working principle of the integrated circuit is explained as follows in detail.

The data memory 10 is configured to transmit the gray-scale value data of the image to the N*M data registers, the weight memory 20 is configured to transmit the data weight corresponding to the gray-scale value data of the image to the N*M weight registers. The N*M data registers are configured to receive the gray-scale value data of the image transmitted by the data register 10 in the first preset time period, and receive the data in the first data transmitted by the data register 10 in the second preset time period. The N*M−1 selectors are configured to enable the second switch selection port (2) of each selector electrically connected to the positive phase output port of each data register or the output port of each FIFO memory, and enable the first switch selection port (1) of each selector disconnected from the data output port of the data memory 10 in the first preset time period, and enable the first switch selection port (1) of each selector electrically connected to the data output port of the data memory 10, and enable the second switch selection port (2) of each selector disconnected from the positive phase output port of each data register or the output port of each FIFO memory in the second preset time period, according to the preset control instruction. The N*M weight registers are configured to receive the data weight corresponding to the gray-scale value data of the image transmitted by the weight memory 20 in the first preset time period, and receive the data weight corresponding to the first data transmitted by the weight memory 20 in the second preset time period. The first to N*M-th multipliers are configured to multiply the gray-scale value data of the images transmitted by the first to N*M-th data registers and the data weight corresponding to the gray-scale value data of the images transmitted by the first to N*M-th weight registers in the first preset time period to obtain multiple products, and transmit the products to the first to N-th adders. The first to N-th adders are configured to add the products transmitted by the first to N*M-th multipliers in the first preset time period, and the (N+1)-th adder A(N+1) is configured to add the outputs from the first to N-th adders to obtain the data in the first data. The first to N*M-th multipliers are configured to multiply the data in the first data transmitted by the first to N*M-th data registers and the data weight corresponding to the first data transmitted by the first to N*M-th weight registers in the second preset time period to obtain multiple products, and transmit the products to the first to N-th adders. The first to N-th adders are configured to add the products transmitted by the first to N*M-th multipliers in the second preset time period, and the (N+1)-th adder A(N+1) is configured to add the outputs from the first to N-th adders to obtain the data in the second data. In the first preset time period, the integrated circuit performs the calculation on the convolutional layer, and the (N+1)-th adder A(N+1) outputs the data of the first data. In the second preset time period, the integrated circuit carries out the calculation on the full connection layer, and the (N+1)-th adder A(N+1) outputs the data of the second data. In the embodiments of the invention, it is assumed that the image includes G*G gray-scale value data, where G is a positive integer greater than 1. In an embodiment, G is equal to 10.

(1) during the calculation of the convolutional layer, that is, the first switch selection port (1) of each selector is disconnected from the output port and the second switch selection port (2) is electrically connected to the output port in the first preset time period:

at a first moment, the data memory 10 transmits a first gray-scale value data of the image to a first register D11, the weight memory 20 transmits the first to N*M-th data weights to the first to N*M-th weight registers, and at second to (G*G+N*M)-th moments, the data weights of the first to N*M-th weight registers remain the same; a first input port (1) of a first multiplier M11 receives the first gray-scale value data and a second input port (2) receives the first data weight, the first multiplier M11 multiplies the first gray-scale value data and the first data weight and obtains a product, which is then transmitted to the first adder A1; at this time, second to N-th data registers, second to N-th weight registers and second to N-th adders have no data; the (N+1)-th adder A(N+1) receives the input of the first adder A1 and outputs output data at the first moment.

At every moment from second to M-th moments, the gray-scale value data stored in a former data register is transmitted to a latter data register. The data register 10 transmits the gray-scale value data from the second to the M-th gray-scale value data successively to the first data register D11 at every moment from second to M-th moments. At (M+1)-th to G-th moments, the M-th data register D1M transmits the gray-scale value data from the first (G−M−1) gray-scale value data successively to the first FIFO memory F1 at every moment, namely, at the G moment, the first FIFO memory F1 stores (G-M-1) gray-scale value data. The gray-scale value data stored in a former data register is transmitted to a latter data register, and the data register 10 transmits the gray-scale value data from (M+1)-th to G-th gray-scale value data successively to the first data register D11 at every moment. At a (G+1)-th to (G+M)-th moment, the first FIFO memory F1 transmits the gray-scale value data from the first M gray-scale value data successively to the (M+1)-th data register D(1M+1) at every moment, that is, the first FIFO memory F1 transmits the gray-scale value data successively to the (M+1)-th data register D(1M+1) at every moment, until all the first M gray-scale value data is transmitted to the (M+1)-th data register D(1M+1). The gray-scale value data stored in a former data register is transmitted to a latter data register, and the data register 10 transmits the gray-scale value data from (G+1)-th to (G+M)-th gray-scale value data successively to the first data register D11 at every moment, until all the gray-scale value data is transmitted to the first data register D11. As so on, until a ((N−1)*G−1)-th moment, at which time, each memory in N*M data registers stores the gray-scale value data, and the first FIFO memory F1 to the (N−1)-th FIFO memory F(N−1) store (G-M)*(N−1) gray-scale value data.

At each moment, the first input port (1) and the second input port (2) of each multiplier from the first multiplier M11 to the N*M-th multiplier MNM receive the gray-scale value data outputted by the first data register D11 to the N*M-th data register DNM and the data weights outputted by the first weight register W11 to the N*M-th weight register WNM respectively, each multiplier multiplies the gray-scale value data with the corresponding data weight to obtain a corresponding product, all the products are inputted to the first to M-th input ports of the first adder A1 to the N-th adder AN, and the data outputted by the first adder to N-th adders is added together by the (N+1)-th adder to obtain the output data of each moment. Until at the moment of G*G+M, all the gray-scale value data of G*G and the data weights is calculated, at this time, the output data of each moment from the first moment to the (G*G−N*M)-th moment is added to obtain an added result, and the added result is regarded as first data of the first data. And then, the data weights in the first to N*M-th weight registers are undated, and second data of the first data is obtained by repeating the processes above, namely, the data weights in the first to N*M-th weight registers are undated once at every G*G+N*M moment, until the data weights corresponding to the gray-scale value data of the image are updated, and all the data in the first data is obtained, and all the first data is stored in the data memory 10 before the calculation of the full connection layer. In one embodiment, it is assumed that the first data includes K*P*Q data, where, K, P and Q are positive integers greater than 1, and P*Q is less than or equal to N*M. in an embodiment, the K, P and Q are 80, 4 and 2, respectively.

(2) during the calculation of the full connection layer, that is, the first switch selection port (1) of each selector is electrically connected to the output port and the second switch selection port (2) is disconnected from the output port in the second preset time period; at this time, the N−1 FIFO memories are in disconnected state and have no effect, and the data memory 10 stores the first data:

considering that P*Q is less than N*M and P*Q is equal to N*M, and when P*Q is less than N*M, (N*M−P*Q) data registers and (N*M−P*Q) weight registers are not involved in the calculation, thus, it is divided into two cases: P*Q less than N*M and P*Q equal to N*M to explain as follows.

(A) when P*Q is less than N*M, the (P*Q+1)-th to (N*M−P*Q)-th data registers, the (P*Q+1)-th to (N*M−P*Q)-th weight registers and the (P*Q+1)-th to (N*M−P*Q)-th multipliers are not involved in the calculations:

at the first moment, the data memory 10 transmits the 1st data in the first data to the first data register D11; at the second moment, the data memory 10 transmits the 1st data in the first data to the second data register D12, and transmits the 2nd data in the first data to the first data register D11; at the third moment, the data memory 10 transmits the 1st data in the first data to the third data register D13, transmits the 2nd data in the first data to the second data register D12, and transmits the 3rd data in the first data to the first data register D11; at the fourth moment, the data memory 10 transmits the 1st data in the first data to the fourth data register D14, transmits the 2nd data in the first data to the third data register D13, and transmits the 3rd data in the first data to the second data register D12, and transmits the 4th data in the first data to the first data register D11, until the P*Q-th moment, the data is stored in all the data registers from the first to P*Q-th, and the (P*Q+1)-th to N*M-th data registers are not used and are not involved in the calculations. At the (P*Q+1)-th moment, the data memory 10 transmits the data in the (P*Q−1)-th data register to the P*Q-th data register DPQ, and transmits the data in the (P*Q−2)-th data register D(P*Q−2) to the (P*Q−1)-th data register D(P*Q−1), and so on, the data memory 10 transmits the data in the first data register D11 to the second data register D12, and the data memory 10 transmits the (P*Q+1)-th data in the first data to the first data register D11; and so on, at every moment after that, the data memory 10 transmits the data stored in a current data register to a next data register, transmits the data stored in a previous data register to the current data register, and transmits new data to the first data register D11, until the data memory 10 transmits the last data in the first data to the P*Q-th data register DPQ at the (K*P*Q+P*Q)-th moment.

At the first moment, the weight memory 20 transmits the first to P*Q-th data weights in the data weights corresponding to the first data to the first to P*Q-th weight registers, and the (P*Q+1) to N*M-th weight registers are not used and are not involved in the calculations. And until the (K*P*Q+P*Q)-th moment, the data weights stored in the first to P*Q-th weight registers remain unchanged.

At each moment, the first input port (1) and the second input port (2) of each of the first multiplier M11 to the P*Q-th multiplier respectively receive the data in the first data transmitted by the first data register D11 to the P*Q-th data register DPQ and the data weights corresponding to the first data and transmitted by the first weight register W11 to the P*Q-th weight register WPQ, and each of the first multiplier M11 to the P*Q-th multiplier multiplies the first data and the data weight to obtain multiplied data, and the multiplied data is input to input ports from the first to M-th input ports of the first adder A1 to the N-th adder AN, to generate corresponding output data, and the (N+1)-th adder A(N+1) adds the output data of the first adder A1 to the N-th adder AN to acquire intermediate data.

After that, the weight memory 20 stores the P*Q data weights into the first to P*Q-th weight registers every (K*P*Q+P*Q) moments, that is, the first to P*Q-th weight registers update the data weight once every (K*P*Q+P*Q) moments, and in every (K*P*Q+P*Q) moments, the data weights in the first to P*Q-th weight registers remain unchanged, and are repeatedly updated K times, and the above calculation processes are repeated for each update of the data weights, until the K*P*Q data weights are updated, thus the (N+1)-th adder A(N+1) obtains K intermediate data and adds the K intermediate data to acquire a corresponding sum, and the sum is taken as the 1st data of the second data. According to the above processes, one of the data in the second data can be obtained after updating the K*P*Q data weights, until all the data in the second data is obtained. In the embodiment of the present invention, it is assumed that the first data includes K*P*Q data, and the data weight corresponding to the first data includes K*P*Q*T data weights, then after the calculation, the second data includes T data, where T is a positive integer greater than 1, and in an embodiment, T is 1280.

(B) when P*Q is equal to N*M, the N*M data registers, the N*M weight registers and the N*M multipliers are involved in the calculations:

at the first moment, the data memory 10 transmits the 1st data in the first data to the first data register D11; at the second moment, the data memory 10 transmits the 1st data in the first data to the second data register D12, and transmits the 2nd data in the first data to the first data register D11; at the third moment, the data memory 10 transmits the 1st data in the first data to the third data register D13, transmits the 2nd data in the first data to the second data register D12, and transmits the 3rd data in the first data to the first data register D11; at the fourth moment, the data memory 10 transmits the 1st data in the first data to the fourth data register D14, transmits the 2nd data in the first data to the third data register D13, and transmits the 3rd data in the first data to the second data register D12, and transmits the 4th data in the first data to the first data register D11, until the N*M-th moment, the data is stored in all the data registers from the first to N*M-th. At the (N*M+1)-th moment, the data memory 10 transmits the data in the (N*M−1)-th data register to the N*M-th data register DNM, and transmits the data in the (N*M−2)-th data register D(NM−2) to the (N*M−1)-th data register D(NM−1), and so on, the data memory 10 transmits the data in the first data register D11 to the second data register D12, and the data memory 10 transmits the (N*M+1)-th data in the first data to the first data register D11; and so on, at every moment after that, the data memory 10 transmits the data stored in a current data register to a next data register, transmits the data stored in a previous data register to the current data register, and transmits new data to the first data register D11, until the data memory 10 transmits the last data in the first data to the N*M-th data register DNM at the (K*P*Q+P*Q)-th moment.

At the first moment, the weight memory 20 transmits the first to N*M-th data weights in the data weights corresponding to the first data to the first to N*M-th weight registers. And until the (K*P*Q+P*Q)-th moment, the data weights stored in the first to N*M-th weight registers remain unchanged.

At each moment, the first input port (1) and the second input port (2) of each of the first multiplier M11 to the N*M-th multiplier respectively receive the data in the first data transmitted by the first data register D11 to the N*M-th data register DNM and the data weights corresponding to the first data and transmitted by the first weight register W11 to the N*M-th weight register WNM, and each of the first multiplier M11 to the N*M-th multiplier multiplies the first data and the data weight to obtain multiplied data, and transmits the multiplied data to input ports from the first input port to the M-th input port of the first adder A1 to the N-th adder AN, to generate corresponding output data, and the (N+1)-th adder A(N+1) adds the output data of the first adder A1 to the N-th adder AN to acquire intermediate data.

After that, the weight memory 20 stores the N*M data weights into the first to N*M-th weight registers every (K*P*Q+N*M) moments, that is, the first to N*M-th weight registers update the data weight once every (K*P*Q+N*M) moments, and in every (K*P*Q+N*M) moments, the data weights in the first to N*M-th weight registers remain unchanged, and are repeatedly updated K times, and the above calculation processes are repeated for each update of the data weights, until the K*P*Q data weights are updated, thus the (N+1)-th adder A(N+1) obtains K intermediate data and adds the K intermediate data to acquire a corresponding sum, and the sum is taken as the 1st data of the second data. According to the above processes, one of the data in the second data can be obtained after updating the K*P*Q data weights, until all the data in the second data is obtained.

When the calculation of the convolutional layer is performed, the gray-scale value data of the image represented by two-dimensional matrix is transformed into three-dimensional matrix, the data weights corresponding to the gray-scale value data of the image represented by two-dimensional matrix are also transformed into three-dimensional matrix, and a convolutional calculation is performed on a gray-scale value data matrix and a data weight matrix. When the calculation of the full connection layer is performed, the input of the full connection layer, namely the first data, is data represented in form of vectors. Assuming that the first data is represented by data(1*S) (where S is a positive integer), in order to enable the first data to operate in the form of convolution, the first data can be transformed into: data(1*S)=data(K*P*Q), that is, the data included in the first data expressed in the form of vectors is transformed into a three-dimensional matrix form. Correspondingly, assuming that the input of the data weights of the full connection layer is represented by weight(S*T) (where both S and T are positive integers), the input of the data weights can transformed into: weight(S*T)=weight(K*P*Q*T), that is, the data weights can also be transformed into a three-dimensional matrix form. In this way, the data(1*S) is divided into data(K*P*Q), the weight(S*T) is divided into T weight (K*P*Q), and convolution operations are performed on the data(K*P*Q) and the weight(K*P*Q) for T times to obtain T pieces of data. That is, the second data is a vector including T pieces of data, and it can be represented by vector (1*T), which has the same result as a product of the vector (I*S) and the vector (S*T).

In the embodiments of the present invention, the integrated circuit includes a data memory 10. N*M data registers, a weight memory 20, N*M weight registers, N−1 FIFO memories, N*M multipliers, and N+1 adders. In the first preset time period, the data memory 10, the N*M data registers, the weight memory 20, the N*M weight registers, the N−1 FIFO memories, the N*M multipliers and the N+1 adders can perform a calculation of the convolutional layer; in the second preset time period, the data memory 10, the N*M data registers, the weight memory 20, the N*M weight registers, the N−1 FIFO memories, the N*M multipliers and the N+1 adders can perform a calculation of the full connection layer. Thus, the integrated circuit can support the calculations of the convolutional layer and of the full connection layer, thereby reducing hardware costs of a convolutional neural network, and effectively utilizing the resources of the convolutional neural network.

It should be understood that the disclosed system, device and method in the embodiments provided by the present invention can be implemented in other ways. For example, the device embodiments described above are merely schematic; for example, the division of the modules is merely a division of logical functions, which can also be realized in other ways.

The modules described as separate parts may be or may not be physically separated, and the assembly units that serve as display modules may or may not be physical units, that is, they may be located in one place, or they may be distributed over multiple network units. Part or all of the modules can be selected according to the actual needs to realize the purpose of this embodiment solutions.

In addition, each functional module in each embodiment of the invention may be integrated into a processing unit, or each unit can also physically exist separately, or two or more units can also be integrated into a unit. The integrated unit mentioned above can be realized either in the form of hardware or in the form of hardware and software functional modules.

For persons of ordinary skills in the art, it is obvious that the invention is not limited to the details of the above embodiment and can be realized in other concrete forms without deviating from the spirit or basic characteristics of the invention. Thus, in all respects, embodiments should be considered and non-restrictive, and the scope of the invention is defined by the attached claims rather than the foregoing description, so as to include in the invention all variations falling within the meaning and scope of the equivalent elements of the claims. Any associated graph mark in a claim shall not be regarded as the claim in which the limitation relates. In addition, it is clear that the word "includes" does not exclude other units or steps, and the singular does not rule out the plural. Multiple modules or devices stated in system rights requirements can also be implemented by a module or device through software or hardware. The first is that the second word is used to represent the name, not in any particular order.

Although the invention is described in combination with specific features and embodiments, it is evident that it can be modified and combined in various ways without departing from the spirit and scope of the invention. Accordingly, this specification and accompanying drawings are only descriptions of the invention as defined by the claims and are deemed to cover any and all modifications, variations, combinations or equivalents within the scope of the invention. The foregoing descriptions are merely embodiments of the present invention, but not intended to limit the protection scope of the present invention. Any variation or replacement made by persons of ordinary skills in the art without departing from the spirit of the present invention shall fall within the protection scope of the present invention. Therefore, the scope of the present invention shall be subject to be appended claims.

The invention claimed is:

1. An integrated circuit, comprising: a data storage circuit, a weight storage circuit and an operation circuit; the data storage circuit and the weight storage circuit electrically connected to the operation circuit; the data storage circuit configured to store gray-scale value data of an image in a first preset time period, according to a preset control instruction, the weight storage circuit configured to store a data weight corresponding to the gray-scale value data of the image in the first preset time period, the operation circuit configured to carry out an operation on the gray-scale value data in the data storage circuit and the data weight in the weight storage circuit in the first preset time period, and output first data; the data storage circuit further configured to store the first data in a second preset time period, according to the preset control instruction, the weight storage circuit further configured to store the data weight corresponding to the first data in the second preset time period, and the operation circuit further configured to carry out an operation on the first data in the data storage circuit and the data weight corresponding to the first data and stored in the weight storage circuit, and output second data wherein the data storage circuit comprises: a data memory, N*M−1 selectors, N*M data registers, and N−1 First in First Output (FIFO) memories; a first switch selection port of each selector and an input port of a first data register electrically connected to a data output port of the data memory, second switch selection ports of first to (M−1)-th selectors correspondingly and electrically connected to positive phase output ports of first to (M−1)-th data registers respectively, and a second switch selection port of a M-th selector electrically connected to an output port of a first FIFO memory, a positive phase output port of a M-th data register electrically connected to an input port of the first FIFO memory; a second switch selection port of each of ((N−2)*M+1)-th to ((N−1)*M−1)-th selectors respectively and electrically connected to a positive phase output port of each of ((N−2)*M+1)-th to ((N−1)*M−1)-th data registers correspondingly, a second switch selection port of a (N−1)*M-th selector correspondingly and electrically connected to an output port of a (N−1)-th FIFO memory, and a positive phase output port of a (N−1)*M-th data register correspondingly and electrically connected to an input port of the (N−1)-th FIFO memory; second switch selection ports of ((N−1)*M+1)-th to (N*M−1)-th selectors respectively and electrically connected to positive phase output ports of ((N−1)*M+1)-th to (N*M−1)-th data registers correspondingly, output ports of first to (N*M−1)-th selectors correspondingly and electrically connected to input ports of second to N*M-th data registers respectively, and positive phase output ports of first to N*M-th data registers electrically connected to the operation circuit; the N*M data registers configured to receive the gray-scale value data of the image transmitted by the data memory in the first preset time period, and receive the data in the first data transmitted by the data memory in the second preset time period; the N*M−1 selectors configured to make the second switch selection port of each selector electrically connected to the positive phase output port of each data register or the output port of each FIFO memory, and make the first switch selection port of each selector disconnected from the data output port of the data memory in the first preset time period, and make the first switch selection port of each selector electrically connected to the data output port of the data memory, and make the second switch selection port of each selector disconnected from the positive phase output port of each data register or the output port of each FIFO memory in the second preset time period, according to the preset control instruction; wherein, M and N are positive integers greater than 1.

2. The integrated circuit of claim 1, wherein, the weight storage circuit comprises: a weight memory and N*M weight registers; an input port of each weight register electrically connected to an output port of the weight memory, and positive phase output ports of first to N*M-th weight registers electrically connected to the operation circuit; the N*M weight registers configured to receive the data weight corresponding to the gray-scale value data of the image transmitted by the weight memory in the first preset time period, and receive the data weight corresponding to the first data transmitted by the weight memory in the second preset time period.

3. The integrated circuit of claim 2, wherein the operation circuit comprises: a multiplication unit and an addition unit; the positive phase output ports of first to N*M−th data registers electrically connected to the operation circuit, comprising: the positive phase output ports of the first to N*M-th data registers electrically connected to the multiplication unit; the positive phase output ports of first to N*M-th weight registers electrically connected to the operation circuit, comprising: the positive phase output ports of the first to N*M-th weight registers electrically connected to the multiplication unit; an output of the multiplication unit electrically connected to the addition unit; the multiplication unit configured to multiply the gray-scale value data of the images transmitted by the first to N*M-th data registers and the data weights corresponding to the gray-scale value data of the images transmitted by the first to N*M-th weight registers and obtain multiple products, and transmit the products to the addition unit; the addition unit is configured to add the products transmitted from the multiplication unit to obtain the data in the first data, in the first preset time period; the multiplication unit further configured to multiply the data in the first data transmitted by the first to N*M-th data registers and the data weights corresponding to the first data transmitted by the first to N*M-th weight registers and obtain multiple products, and transmit the products to the addition unit; the addition unit further configured to add the products transmitted from the multiplication unit to obtain the data in the second data, in the second preset time period.

4. The integrated circuit of claim 3, wherein, the multiplication unit comprises: N*M multipliers; the positive phase output ports of the first to N*M-th data registers electrically connected to the multiplication unit, comprising: the positive phase output port of each of the first to N*M-th data registers respectively and electrically connected to a first input port of each of first to N*M-th multipliers correspondingly; the positive phase output ports of the first to N*M-th weight registers electrically connected to the multiplication unit, comprising: the positive phase output port of each of the first to N*M-th weight registers respectively and electrically connected to a second input port of each of the first to N*M-th multipliers correspondingly; the multiplication unit configured to multiply the gray-scale value data of the images transmitted by the first to N*M-th data registers and the data weights corresponding to the gray-scale value data of the images transmitted by the first to N*M-th weight registers, in the first preset time period, comprising: the first to N*M-th multipliers configured to multiply the gray-scale value data of the images transmitted by the first to N*M-th data registers and the data weight corresponding to the gray-scale value data of the images transmitted by the first to N*M-th weight registers in the first preset time period; the multiplication unit further configured to multiply the data in the first data transmitted by the first to N*M-th data registers and the data weights corresponding to the first data transmitted by the first to N*M-th weight registers, in the second preset time period, comprising: the first to N*M-th multipliers configured to multiply the data in the first data transmitted by the first to N*M-th data registers and the data weights corresponding to the first data transmitted by the first to N*M-th weight registers in the second preset time period.

5. The integrated circuit of claim 4, wherein the addition circuit comprises: N+1 adders; the output of the multiplication unit electrically connected to the addition unit, comprising: output ports of the first to M-th multipliers respectively and electrically connected to first to M-th input ports of a first adder, output ports of (1*M+I)-th to 2*M-th multipliers respectively and electrically connected to first to M-th input ports of a second adder, output ports of ((N−2)*M+1)-th to ((N−1)*M)-th multipliers respectively and electrically connected to first to M-th input ports of a (N−1)-th adder, output ports of ((N−1)*M+1)-th to N*M-th multipliers respectively and electrically connected to first to M-th input ports of a N-th adder; output ports of first to N-th adders respectively and electrically connected to first to N-th input ports of a (N+1)-th adder, an output port of the (N+1)-th adder outputting the first data in the first preset time period and outputting the second data in the second preset time period; the addition unit configured to add the products transmitted from the multiplication unit to obtain the data in the first data, comprising: the first to N-th adders configured to add the products transmitted by the first to N*M-th multipliers in the first preset time period, and the (N+1)-th adder configured to add outputs from the first to N-th adders to obtain the data in the first data; the addition unit further configured to add the products transmitted from the multiplication unit to obtain the data in the second data, comprising: the first to N-th adders configured to add the products transmitted by the first to N*M-th multipliers in the second preset time period, and the (N+1)-th adder configured to add the outputs from the first to N-th adders to obtain the data in the second data.

6. The integrated circuit of claim 1, wherein the N and the M are equal.

7. The integrated circuit of claim 1, wherein the N and the M are both equal to 3.

8. The integrated circuit of claim 2, wherein, the data memory is a memory whose model is IS6IC256AL or IS61LV6416 or CY62128B, the N*M data registers are registers whose model is 74LS175 or 74LS 194, the model of the N*M−1 selectors is SN54HC257 or SN54HC258 or SN74HC257 or SN74HC257 or SN74HC258, the N-1 FIFO memories are FIFO memories whose model is AL422 or AL422B or AL400B-12 or GS7201AL, the weight memory is a memory whose model is IS6IC256AL or IS61LV6416 or CY62128B, and the N*M weight registers are registers whose model is 74LS 175 or 74LS 194.

9. The integrated circuit of claim 5, wherein, the model of the N*M multipliers is GC1496 or GC1496B, and the model of the N+ adders is 74LS283 or 74LS580 or 74ALS580.

* * * * *